(12) United States Patent
Park et al.

(10) Patent No.: US 9,742,004 B2
(45) Date of Patent: Aug. 22, 2017

(54) CATHODE ADDITIVES FOR LITHIUM SECONDARY BATTERY WITH HIGH CAPACITY

(71) Applicant: LG Chem, Ltd., Seoul (KR)

(72) Inventors: Sun-Ju Park, Daejeon (KR); Sook Yun, Daejeon (KR); Vin-Na Jo, Daejeon (KR); Cha-Hun Ku, Daejeon (KR); Pil-Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/440,712

(22) PCT Filed: Sep. 3, 2014

(86) PCT No.: PCT/KR2014/008264
§ 371 (c)(1),
(2) Date: May 5, 2015

(87) PCT Pub. No.: WO2015/034257
PCT Pub. Date: Mar. 12, 2015

(65) Prior Publication Data
US 2015/0340692 A1    Nov. 26, 2015

(30) Foreign Application Priority Data

Sep. 5, 2013 (KR) .......... 10-2013-0106746
Sep. 3, 2014 (KR) .......... 10-2014-0116894

(51) Int. Cl.
| | |
|---|---|
| *H01M 4/36* | (2006.01) |
| *H01M 4/505* | (2010.01) |
| *H01M 4/58* | (2010.01) |
| *H01M 10/0525* | (2010.01) |
| *H01M 4/38* | (2006.01) |
| *H01M 4/485* | (2010.01) |
| *H01M 4/525* | (2010.01) |
| *H01M 10/052* | (2010.01) |
| *H01M 4/587* | (2010.01) |

(52) U.S. Cl.
CPC ............. *H01M 4/364* (2013.01); *H01M 4/38* (2013.01); *H01M 4/386* (2013.01); *H01M 4/387* (2013.01); *H01M 4/485* (2013.01); *H01M 4/505* (2013.01); *H01M 4/525* (2013.01); *H01M 4/587* (2013.01); *H01M 4/5825* (2013.01); *H01M 10/052* (2013.01); *H01M 10/0525* (2013.01); *H01M 4/58* (2013.01); *Y02E 60/122* (2013.01)

(58) Field of Classification Search
CPC ...... H01M 4/364; H01M 4/386; H01M 4/587; H01M 4/38; H01M 4/387; H01M 4/58; H01M 4/5825; H01M 4/505; H01M 4/525; H01M 10/0525; Y02E 60/122
See application file for complete search history.

(56) References Cited

U.S. PATENT DOCUMENTS

| | | |
|---|---|---|
| 2010/0279172 A1 | 11/2010 | Hwang et al. |
| 2011/0123849 A1 | 5/2011 | Ryu et al. |
| 2012/0021287 A1 | 1/2012 | Lee et al. |
| 2012/0094181 A1 | 4/2012 | Kim et al. |
| 2012/0164533 A1 | 6/2012 | Senoue et al. |
| 2012/0244440 A1 | 9/2012 | Lee et al. |
| 2013/0101899 A1 | 4/2013 | Kajita et al. |
| 2014/0220455 A1* | 8/2014 | Lee ...................... H01M 4/386 429/331 |

FOREIGN PATENT DOCUMENTS

| | | |
|---|---|---|
| EP | 2139059 A1 | 12/2009 |
| EP | 2584634 A1 | 4/2013 |
| JP | H10-208730 A | 8/1998 |
| JP | 2010262914 A | 11/2010 |
| JP | 2012142156 | 7/2012 |
| KR | 100544515 B1 | 1/2006 |
| KR | 20100136073 A | 12/2010 |
| KR | 20110058129 A | 6/2011 |
| KR | 20110107718 A | 10/2011 |
| KR | 20120108902 A | 10/2012 |
| WO | 03081697 A1 | 10/2003 |
| WO | 2011118870 A1 | 9/2011 |
| WO | 2011162090 A1 | 12/2011 |
| WO | 2013094465 A1 | 6/2013 |

OTHER PUBLICATIONS

International Search Report for Application No. PCT/KR2014/008264 dated Jan. 8, 2015.
Extended Search Report from European Application No. 14842619.0, dated Jun. 7, 2016.

* cited by examiner

Primary Examiner — Laura Weiner
(74) Attorney, Agent, or Firm — Lerner, David, Littenberg, Krumholz & Mentlik, LLP

(57) ABSTRACT

The present disclosure refers to a lithium secondary battery comprising $Li_2NiO_2$ in a cathode active material so as to improve the phenomenon that the capacity retention ratio decreases at initial cycles when using an anode active material selected from the group consisting of Si, SiC, $SiO_x$ (0<x<2), Sn, $SnO_2$, Sb, Ge and a mixture thereof. The lithium secondary battery according to the present disclosure can substantially improve the decrease of a capacity retention ratio during initial cycles.

4 Claims, 1 Drawing Sheet

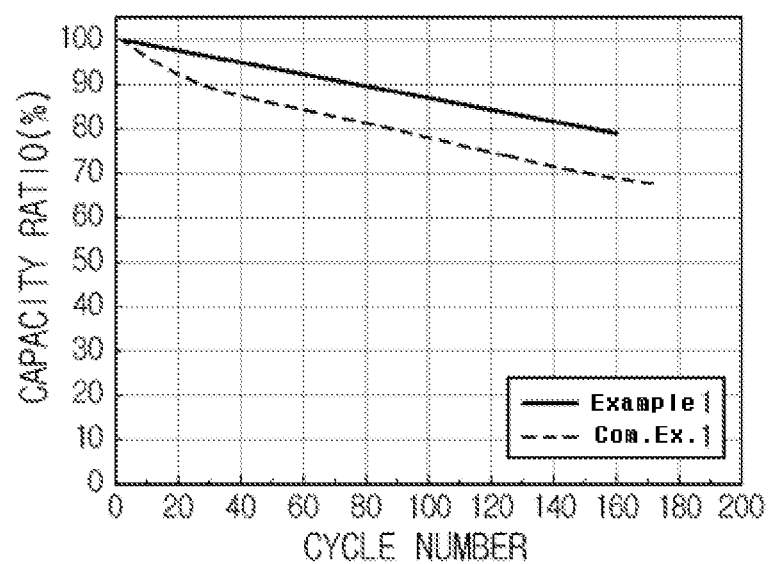

US 9,742,004 B2

CATHODE ADDITIVES FOR LITHIUM SECONDARY BATTERY WITH HIGH CAPACITY

CROSS-REFERENCE TO RELATED APPLICATION

This application is a national phase entry under 35 U.S.C. §371 of International Application No. PCT/KR2014/008264, filed Sep. 3, 2014, which claims priority to Korean Patent Application No. 10-2013-0106746, filed Sep. 5, 2013 and Korean Patent Application No. 10-2014-0116894, filed Sep. 3, 2014, the disclosures of which are incorporated herein by reference.

TECHNICAL FIELD

The present disclosure relates to an additive to be used in the cathode of a lithium secondary battery with high capacity, more specifically a lithium secondary battery comprising $Li_2NiO_2$ in a cathode so as to improve the phenomenon that a capacity retention ratio decreases during initial cycles when a non-carbon-based material is used as an anode active material.

BACKGROUND ART

Recently, there has been an increasing interest in energy storage technology. As the application fields of energy storage technologies have been extended to mobile devices such as cellular phones, camcorders and notebook computers, as well as electric motors, the demand for batteries as a power source to have high energy density has been increasing. Lithium secondary batteries are considered as the best one capable of satisfying such a demand, and the researches thereof have been actively made.

Among secondary batteries currently used, a lithium secondary battery developed in the early 1990's comprises an anode made of carbon materials capable of intercalating or disintercalating lithium ions, a cathode made of lithium-containing oxides, and a non-aqueous electrolyte solution obtained by dissolving a suitable amount of lithium salt in a mixed organic solvent.

As the anode active material of the lithium secondary battery, various carbon-based materials, including artificial graphite, natural graphite, and hard carbon which can intercalate and disintercalate lithium ions have been used. Among these carbon-based materials, graphite has low discharge voltage of −0.2V relative to lithium, so a battery using graphite as an anode active material exhibits high discharge voltage of 3.6V. Therefore, such a graphite active material has been the most widely used since it can provide advantages in term of the energy density of a lithium battery and also has good reversibility to ensure the long life time of the lithium secondary battery. However, the graphite active material has low density (theoretical density 2.2 g/cc) in the preparation of an electrode to provide low capacity, which is unfavorable in terms of energy density per unit volume of the electrode, and also it is apt to react with organic electrolyte adversely at high discharge voltage, which may result in ignition or explosion by the abnormal operation, overcharging of the battery and so on.

Recently, as the use of lithium secondary batteries expands, there are gradually increasing demands for a lithium secondary battery capable of maintaining good performances under severe conditions such as high temperature and/or low temperature and being stably charged even at high voltage.

Meanwhile, it is possible to improve the capacity characteristic of a lithium secondary battery by changing carbon-based anode active materials with non-carbon-based materials such as silicon oxide. However, some anode materials including silicon oxide are irreversible. Therefore, some anode materials intercalate lithium ions at the first charge and cannot disintercalate about 20% of the lithium ions in the later discharge. Accordingly, about 20% of cathode active materials used in the first charge cannot be involved in the following charge and discharge after the first charge, and eventually the efficiency of the lithium secondary battery is lowered.

In order to solve this problem, there has been attempted to prepare a nanoparticle composite consisting of a carbon-based material and a silicon-based material and use it as an anode active material. Such a nanoparticle composite can improve the capacity retention ratio of a battery to a degree by means of the carbon-based material acting as an electrical conductor. However, the carbon-based material should be excessively present in an amount more than 50 wt % in the nanoparticle composite in order to provide relatively good capacity retention to the battery, which reduces a capacity of the battery. Further, although the carbon-based material present in an excessive amount as disclosed in the above, there is still a problem that a capacity on or after the $50^{th}$ cycle is lowered less than 1500 mAh/g.

Therefore, there is a need to develop a lithium secondary battery that can improve the decrease of a capacity retention ratio during initial cycles when a non-carbon-based material is used as an anode material.

DISCLOSURE

Technical Problem

The present disclosure is designed to solve the above-mentioned problems, and therefore it is an object of the present disclosure to provide a lithium secondary battery that can improve the decrease of a capacity retention ratio during initial cycles when a non-carbon-based material is used as an anode material.

For this, the present disclosure provides a lithium secondary battery that can supply sufficient lithium in an anode at the first charge and supplement lithium being consumed in the anode during cycling.

Technical Solution

In order to achieve the above object, in accordance with one aspect of the present disclosure, there is provided a lithium secondary battery, comprising a cathode active material containing a compound of $Li_2NiO_2$, and an anode active material containing any one selected from the group consisting of Si, SiC, $SiO_x$ (0<x<2), Sn, $SnO_2$, Sb, Ge and a mixture thereof.

The cathode active material may contain the compound of $Li_2NiO_2$ in an amount of 1 to 10 wt %.

The anode active material may contain any one selected from the group consisting of Si, SiC, $SiO_x$ (0<x<2), Sn, $SnO_2$, Sb, Ge and a mixture thereof in an amount of 1 to 30 wt %.

Besides $Li_2NiO_2$, the cathode active material may further contain any one selected from the group consisting of $Li_xCoO_2$(0.5<x<1.3), $Li_xNiO_2$(0.5<x<1.3), $Li_xMnO_2$ (0.5<x<1.3), $Li_xMn_2O_4$(0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}Mn_yO_2$ (0.5<x<1.3, 0≤y<1), $Li_xNi_{1-y}Mn_yO_2$(0.5<x<1.3, O≤y<1), $Li_x(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}CO_zO_4$ (0.5<x<1.3, 0<z<2), $Li_xCoPO_4$(0.5<x<1.3), $Li_xFePO_4$ (0.5<x<1.3) and a mixture thereof.

Besides any one selected from the group consisting of Si, SiC, $SiO_x$ (0<x<2), Sn, $SnO_2$, Sb, Ge and a mixture thereof, the anode active material may further contain any one selected from the group consisting of soft carbon, hard carbon, natural graphite, Kish graphite, pyrolytic carbon, mesophase pitch based carbon fiber, meso-carbon microbeads, Mesophase pitches, petroleum derived cokes, coal tar pitch derived cokes and a mixture thereof.

The lithium secondary battery can have a capacity retention ratio of 90% or more after 50 cycles.

Advantageous Effects

The lithium secondary battery according to the present disclosure can remarkably improve the decrease of a capacity retention ratio during initial cycles and, therefore, show a high capacity retention ratio.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

FIG. 1 is a graph showing capacity retention ratio (%) over cycles of batteries (cells) prepared in the Example 1 and the Comparative Example 1 of the present disclosure.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The cathode of the present disclosure comprises lithium nickel oxide expressed by $Li_2NiO_2$. $Li_2NiO_2$ can disintercalate lithium ion in an amount of 1 mol or more on the first charge, and then can intercalate and disintercalate lithium ion in an amount of 1 mol or less on and after the first discharge. Accordingly, $Li_2NiO_2$ added to the cathode can provide lithium ions enough to supplement the irreversibility of an anode, and thus the great irreversibility of the anode on the first discharge can be supplemented.

$Li_2NiO_2$ may be contained in an amount of 1 to 10 wt % in the cathode active material. When the amount of $Li_2NiO_2$ satisfies such range, the charging and discharging processes can be made without battery damage and the cycle characteristics of the battery may not deteriorate. More specifically, the lithium secondary battery can exhibit a capacity retention ratio of 90% or more on or after the $50^{th}$ cycle. If $Li_2NiO_2$ is used in an amount exceeding the upper limit, $Li_2NiO_2$ is subject to a phase change into $LiNiO_2$ after the first charge, thereby battery safety unfavorably deteriorates. Generally, $LiNiO_2$ has a lower stability than that of $LiCoO_2$.

Other cathode active materials which may be used together with lithium nickel oxide are not particularly limited if they have been conventionally used in the art. Non-limiting examples of the usable cathode active materials may include lithium-containing transition metal oxides, for example, $Li_xCoO_2$(0.5<x<1.3), $Li_xNiO_2$(0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}Mn_yO_2$ (0.5<x<1.3, 0≤y<1), $Li_xNi_{1-y}Mn_yO_2$(0.5<x<1.3, O≤y<1), $Li_x(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}CO_zO_4$ (0.5<x<1.3, 0<z<2), $Li_xCoPO_4$(0.5<x<1.3), $Li_xFePO_4$ (0.5<x<1.3) and a mixture thereof. These lithium-containing transition metal oxides may be coated with a metal such as aluminum (Al) or a metal oxide. Also, besides the lithium-containing transition metal oxides, sulfides, selenides and halides of lithium-containing transition metals may also be used.

The anode of the present disclosure comprises an anode active material selected from the group consisting of Si, SiC, $SiO_x$ (0<x<2), Sn, $SnO_2$, Sb, Ge and a mixture thereof. The anode active material selected from the group consisting of Si, SiC, $SiO_x$ (0<x<2), Sn, $SnO_2$, Sb, Ge and a mixture thereof may be used together with other anode active materials which have been conventionally used in the art, and may be contained in an amount of 1 to 30 wt % in the total anode active materials.

Generally, batteries may be prepared considering design factors, which include an electrochemical balance between a cathode and an anode. That is, even though the batteries are designed to adopt a cathode with high capacity and an anode with high capacity, it does not mean that such batteries necessarily exhibit a high capacity. In this aspect, in order to prepare a battery with high capacity, the anode active material selected from the group consisting of Si, SiC, $SiO_x$ (0<x<2), Sn, $SnO_2$, Sb, Ge and a mixture thereof is preferably contained in an amount of 1 to 15 wt % in the total anode active materials. It is difficult to supplement the irreversibility of lithium ions even though $Li_2NiO_2$ is used in the cathode active material in case that the anode active material is used in an amount exceeding the upper limit. If the anode active material is used in an amount less than the lower limit, the effect of capacity increase is insufficient.

Non-limiting examples of other anode active materials which have been conventionally used in the art may include carbon-based materials, metallic lithium and so on which can intercalate and disintercalate lithium ions. The carbon-based materials may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, meso-carbon microbeads, mesophase pitches, and high-temperature sintered carbon such as petroleum or coal tar pitch derived cokes.

The cathode and/or the anode may comprise a binder, and various kinds of binder polymers including vinylidene fluoride-hexafluoropropylene copolymer (PVDF-co-HFP), polyvinylidene fluoride, polyacrylonitrile and polymethylmethacrylate may be used as the binder.

The above-mentioned lithium secondary battery of the present disclosure is prepared by introducing a non-aqueous electrolyte solution in an electrode assembly consisting of a cathode, an anode, and a separator interposed therebetween.

As the cathode, anode, and separator constituting the electrode assembly, those which have been conventionally used in the preparation of lithium secondary batteries may be used.

Also, the separator may be obtained from a porous polymer film which is conventionally used alone or in the form of lamination in conventional separators, for example, porous polymer films made of polyolefin-based polymers such as ethylene homopolymer, propylene homopolymer, ethylene/butene copolymer, ethylene/hexene copolymer and ethylene/methacrylate copolymer. Also, as the separator, conventional porous non-woven fabrics such as a non-woven fabric made of glass fiber having a high melt point or polyethylene terephthalate fiber may be used, but is not limited thereto.

The non-aqueous electrolyte solution used in the present disclosure comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The non-aqueous electrolyte solution used in the present disclosure comprises an organic solvent which is conventionally used in an electrolyte solution for a lithium secondary battery, for example, ethers, esters, amides, linear carbonates, cyclic carbonates, and a mixture thereof.

Among these, a carbonate compound such as a linear carbonate, a cyclic carbonate, or a mixture thereof is representatively used. Specific examples of the cyclic carbonate may include ethylene carbonate (EC), propylene carbonate (PC), 1,2-butylene carbonate, 2,3-butylene carbonate, 1,2-pentylene carbonate, 2,3-pentylene carbonate, vinylene carbonate, a halide thereof and a mixture thereof. Specific examples of the linear carbonate may include dimethyl carbonate (DMC), diethyl carbonate (DEC), dipropyl carbonate, ethyl methyl carbonate (EMC), methyl propyl carbonate, ethyl propyl carbonate and a mixture thereof, but are not limited thereto.

In particular, among the above carbonate-based organic solvents, the cyclic carbonates such as ethylene carbonate and propylene carbonate are preferably used since they have a high viscosity and a high dielectric constant to more easily dissociate a lithium salt in an electrolyte. More preferably, such a cyclic carbonate can be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

In addition, the electrochemical device of the present disclosure is not limited to its shape. For example, the shape of the electrochemical device may be cylindrical such as a can, prismatic, pouch, or coin.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

Example 1

A cathode active material consisting of Al-doped LiNiCoO$_2$ (LiNi$_{80}$Co$_{15}$Al$_5$O$_2$) and Li$_2$NiO$_2$ in a weight ratio of 95:5 was provided. Subsequently, the cathode active material, polyvinylidene fluoride as a binder, and carbon as a conductive material were mixed in the weight ratio of 8:1:1, and the mixture was dispersed in N-methyl-pyrrolidone to obtain a cathode slurry. The slurry was coated on a current collector made of aluminum, followed by drying and compressing, to prepare a cathode.

Also, an anode active material consisting of graphite and SiO in the weight ratio of 9:1 was provided. Subsequently, the anode active material, styrene butadiene rubber (SBR), and carboxyl methyl cellulose (CMC) were mixed in a weight ratio of 90:5:5, and the mixture was dispersed in water to obtain an anode slurry. The slurry was coated on a current collector made of copper, followed by drying and compressing, to prepare an anode.

1M LiPF$_6$ solution comprising ethylene carbonate and ethylmethyl carbonate in the volume ratio of 1:2 was used as an electrolyte solution.

Then, the cathode and the anode obtained above were assembled with a polyethylene(PE) separator by a conventional method to prepare a coin-type full cell, in which the electrolyte solution was introduced. Thereby, the coin-type full cell was finally prepared.

Comparative Example 1

The procedures of Example 1 were repeated except that Li$_2$NiO$_2$ was not used, to prepare a coin-type full cell.

Test Example: Measurement of Capacity Retention Ratio Per Cycle

The coin-type full cells prepared in Example 1 and Comparative Example 1 were tested on charge and discharge cycles under the conditions of 0.5C charge and 1C discharge, and the results thereof are shown in FIG. 1.

As shown in FIG. 1, the lithium secondary battery of Example 1 exhibited and maintained a remarkable improvement of phenomenon that a capacity retention ratio (%) decreases at the initial cycles, as compared with that of Comparative Example 1.

What is claimed is:
1. A lithium secondary battery comprising a cathode containing a cathode active material, an anode containing an anode active material and a separator, wherein
 the cathode active material contains
 (1) a compound of Li$_2$NiO$_2$ in an amount of 1 to 10 wt %, and
 (2) a lithium-containing transition metal oxide other than the compound of Li$_2$NiO$_2$, and the anode active material contains
 (1) a carbon-based material, and
 (2) SiO$_x$ (0<x<2) in an amount of 10 to 15 wt %.

2. The lithium secondary battery of claim 1, wherein the lithium-containing transition metal oxide other than the compound of $Li_2NiO_2$ is any one selected from the group consisting of $Li_xCoO_2$(0.5<x<1.3), $Li_xNiO_2$(0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0≤y<1), $Li_xCo_{1-y}Mn_yO_2$ (0.5<x<1.3, 0≤y<1), $Li_xNi_{1-y}Mn_yO_2$(0.5<x<1.3, 0≤y<1), $Li_x(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$ (0.5<x<1.3, 0<z<2), $Li_xCoPO_4$(0.5<x<1.3), $Li_xFePO_4$ (0.5<x<1.3) and a mixture thereof.

3. The lithium secondary battery of claim 1, wherein the carbon-based material is any one selected from the group consisting of soft carbon, hard carbon, natural graphite, kish graphite, pyrolytic carbon, mesophase pitch based carbon fiber, meso-carbon microbeads, Mesophase pitches, petroleum derived cokes, coal tar pitch derived cokes and a mixture thereof.

4. The lithium secondary battery of claim 1, which has a capacity retention of 90% or more after 50 cycles.

* * * * *